Sept. 26, 1961 R. W. KETCHLEDGE ET AL 3,002,066

MAGNETICALLY CONTROLLED SWITCHING DEVICE

Filed July 1, 1959

INVENTORS: R. W. KETCHLEDGE
C. A. LOVELL
BY Henry M. Bissell
ATTORNEY 3,002,066
Patented Sept. 26, 1961

3,002,066

MAGNETICALLY CONTROLLED SWITCHING DEVICE

Raymond W. Ketchledge, Whippany, and Clarence A. Lovell, Summit, N.J., assignors to Bell Telephone Laboratories, Incorporated, New York, N.Y., a corporation of New York Filed July 1, 1959, Ser. No. 824,224
12 Claims. (Cl. 200—87)

This invention relates to electromechanical switching devices and more particularly to such a device employing a remanent magnetic material.

In switching applications, such as are encountered, for example, in telephone systems, it is necessary to provide interconnecting facilities which are rugged, reliable and economical. An element which satisfies these requirements is the electromechanical switch or relay. However, with the advent of high speed electronic devices, the further requirement of high speed performance is placed upon the relay in order to keep pace with the balance of the telephone system operation.

Normal relay operation is realized by energizing a coil on the relay which in turn establishes a magnetic field that operates the relay contacts. Removal of the source of energy from the coil permits the magnetic field to collapse and the relay contacts to be restored to normal. In practice the electromagnetic field may be established in a fraction of a millisecond. The relay contacts on the other hand, require a significantly longer time to respond. Even though the contacts, once operated, may be held closed by other means such as mechanical or magnetic latching arangements, the electromagnetic field must be maintained until the relay is operated.

As the operation of the relay contacts is slow relative to the speed of operation of electronic components, systems employing such relays in particular areas, such as the subscriber line interconnections in a telephone system, necessarily are limited in overall speed of operation by the response time of the relay. As a result, considerable effort has been expended in a search for devices which perform equivalent switching functions in a sufficiently short response time to be compatible with electronic control equipment. In general, such devices have not been found which possess all of the desirable characteristics of the relay.

One solution to this problem is disclosed in copending application Serial No. 824,222, filed July 1, 1959, of A. Feiner, C. A. Lovell, T. N. Lowry and P. G. Ridinger. Devices disclosed therein render the relatively slow response mechanical switch itself compatible with electronic control signals. This compatibility is achieved by the combination of a bistable, remanently magnetic element with a magnetically responsive switch. The bistable element is pulsed by electronic control signals and assumes a corresponding remanent magnetic condition. Thereafter, in its normal response time, the associated switch responds to this remanent magnetic condition. Thus, in a telephone system employing such devices, electronic control equipment is not tied up by the necessity of maintaining the magnetic field of the relay until its switch contacts operate.

It is an object of this invention to provide an improved electromechanical switching device.

A further object of this invention is to provide an electromechanical switching device which is compatible with electronic control signals.

Another object of this invention is to provide an electromechanical switching device responsive to control signals of a duration shorter than the response time of the switch.

The instant invention in one specific embodiment thereof comprises a bistable remanent magnetic member of a material, which advantageously may be one of the ferrites, exhibiting a plurality of stable remanent magnetization states. This member has two windings individually wound on separate longitudinal sections thereof and further possesses a length relative to its lateral dimensions such that these sections are individually magnetizable under the influence of the magnetic fields produced by the corresponding windings.

In this specific embodiment of the invention, this member is a ferrite rod. A magnetically permeable reed switch of the type disclosed in "Development of Reed Switches and Reed Relays" by O. M. Hovgaard et al., volume 34, Bell System Technical Journal, page 309 ff., is connected at its terminals to the corresponding ends of the ferrite rod by magnetically permeable clips which are shaped to extend the magnetic circuit to a point opposite the middle of the rod. The reed switch is suitable for use in this invention because of its capability of responding to relatively weak magnetic fields. The magnetically permeable clips serve to provide a low reluctance path for magnetic flux and may be of any suitable high permeability material known in the art.

Since the ferrite rod of the instant invention is individually magnetizable in sections, the remanent magnetization states of the separate sections may be established in aiding or opposing polarity. Furthermore, the magnetic condition of the rod may be reversed by the application of a current signal to only one of the associated windings. If the sections of the rods are magnetized in the same direction, opposite magnetic poles are produced at the ends of the rod. When these poles exist, magnetic flux is driven through the external magnetic path including the reed switch to close the contacts thereof. If the sections are magnetized oppositely, like magnetic poles exist at the ends of the rod. In this case, little or no flux is driven through the switch and the switch contacts release under the influence of their resilient suspension members. The release of the switch contacts is assisted by leakage flux leaving the ferrite rod at its midpoint.

A modification of the invention, in accordance with an aspect thereof, provides a laterally extended portion at the middle of the ferrite rod to improve the operation of the device embodying the invention. This modification provides a magnetic path of lower reluctance than is otherwise afforded for the leakage flux leaving the ferrite rod at its midpoint. Accordingly the release of the switch contacts is enhanced thereby.

A second specific embodiment of this invention employs a similar structure including a ferrite rod with a pair of windings thereon but further including a second glass-sealed reed switch similarly suspended on the opposite side of the rod from the glass-sealed reed switch described in the above-mentioned specific embodiment. This arrangement then provides a pair of switches which are controlled together by the magnetic state of the ferrite rod, thus doubling the number of contacts associated with the ferrite rod of the first-mentioned specific embodiment.

It is a feature of this invention that a single rod of a magnetic material capable of assuming a pair of stable remanent magnetization states be combined with an electromechanical switching device such that the magnetization states of distinct portions of the magnetic rod produce or eliminate external magnetic poles at the ends of the rod, thereby selectively controlling the operation of the switch contacts.

It is another feature of this invention that a ferrite rod, connected to an electromechanical switching device and having a plurality of distinct windings thereon, has the magnetization state of a portion thereof switched by a current pulse applied to only one winding without disturbing the magnetization state of the remaining portion of the rod, thereby changing the condition of the switch contacts.

It is also a feature of this invention that a ferrite rod be connected to a plurality of magnetically responsive switches in such a manner that establishment of particular magnetization states in the ferrite controls the contact states of the plurality of switches.

It is a further feature of this invention that low reluctance magnetic paths be provided for leakage flux in a magnetic circuit excluding a magnetically responsive switch but including the remanently magnetic member controlling the switch.

A complete understanding of this invention and of these and other features thereof may be gained from the following detailed description and the accompanying drawing, in which.

Figure 1:
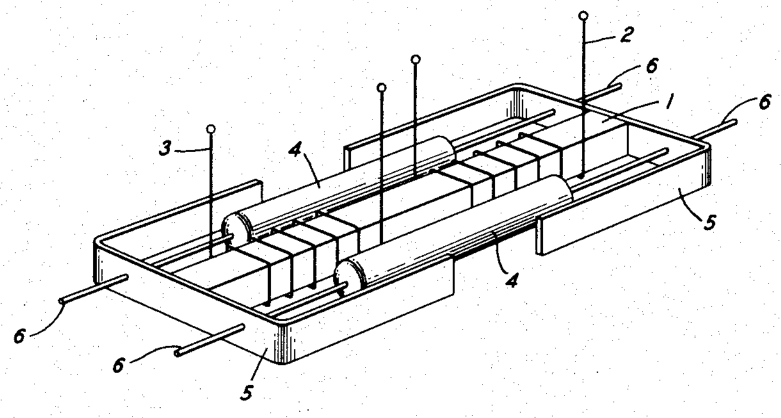
FIG. 1 is a drawing of one specific embodiment of the invention.

In FIG. 1, a rod 1 of a material exhibiting two stable remanent magnetization states, which material advantageously may be a ferrite, is shown having separate windings 2 and 3 located at different longitudinal portions thereon. A pair of reed switches 4 are positioned along the rod 1 on opposite sides thereof by means of supporting members 5 which attach the switch terminals 6 to the corresponding ends of the rod 1. Although not shown, suitable insulators, such as small bushings, are provided to maintain the terminals 6 electrically isolated from each other. The members 5 are of a magnetically permeable material to provide a low reluctance path for magnetic flux.

The reed switches 4 operate in response to magnetic flux through them from opposite magnetic poles which are produced at the ends of the ferrite rod for one particular magnetization condition of the rod. In the absence of such mangetic poles no flux is driven through the switches 4 and the contacts are released.

The rod 1 is of such a length relative to its lateral dimensions that energization of only one of the windings 2 and 3 does not affect the remanent magnetization state of the portion of the rod 1 enclosed by the other winding. This effect is enhanced by the members 5 which are curved around the sides of the structure so as to provide a low reluctance path for leakage flux entering or leaving the midpoint of the rod 1. The rod therefore becomes in effect two separate magnets arranged end to end and individually controlled by the associated windings 2 and 3.

Figure 3:
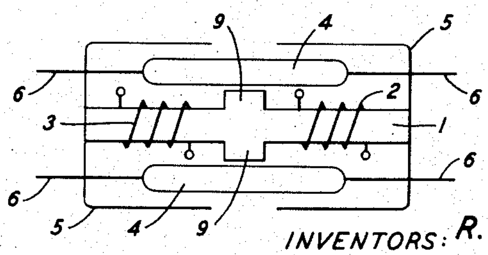
FIG. 3 is a plan view of the specific embodiment of FIG. 1 modified in accordance with an aspect of the invention.

This effect is further enhanced by a modification of the described structure which is depicted in FIG. 3 in which corresponding designations have been assigned to corresponding parts of the figure. In FIG. 3 the structure of FIG. 1 is shown in plan view modified in accordance with one aspect of the invention. The difference between the structures of the two figures resides in the shape of the rod 1. In FIG. 3 it is shown having lateral extensions 9 at the mid-section thereof. This configuration reduces the reluctance of the paths for leakage flux existing when the device is in the released condition, thus facilitating the reversal of the remanent magnetization state of only one portion of the rod by the energization of a single winding.

Figure 2A:
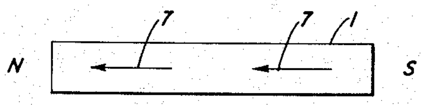
FIGS. 2A and 2B are diagrams of two separate magnetization conditions of a portion of the embodiment of FIG. 1.

FIG. 2A illustrates one magnetic condition of the rod 1 in which the remanent magnetization states present in adjacent sections of the rod, represented by the arrows 7, are established in the same direction. The two sections of the rod 1 thus reinforce each other magnetically and produce external magnetic poles at the ends of the rod as indicated. With the respective magnetization states as shown, flux is driven from the external magnetic poles of the rod 1 through the magnetically permeable clips 5 and the switches 4 to close the switch contacts. Since both switches 4 are in parallel magnetic circuits across the rod 1, they will be operated together.

Figure 2B:
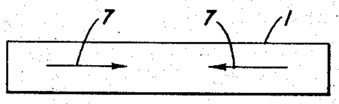

FIG. 2B shows the rod 1 with the magnetization states of the respective sections thereof, represented by the arrows 7, opposing each other. In this case the magnetic poles at the ends of the rod 1 are of the same polarity. Accordingly, the magnetization pattern depicted in FIG. 2B causes the contacts of the switches 4 to release, since these contacts will have like magnetic poles induced thereon, thus repelling each other.

This invention provides an electromechanical relay which may be controlled by very short pulses, that is, by pulses which are substantially shorter than the response time of the magnetically responsive mechanical switches. Control pulses are applied to the windings 2 or 3 to produce the magnetization conditions depicted in FIGS. 2A and 2B as desired. Switches 4 operate in response to a predetermined magnitude of magnetic flux through them and are independent of the polarity of this flux. Thus it can be seen that a reversal of the direction of both arrows 7 in FIGS. 2A and 2B with a corresponding reversal of the external magnetic poles shown in FIG. 2A results in equivalent control states for the device of this invention.

Because of the difference in the response times of the magnetic material of the rod 1 and the mechanical switches 4, it is possible to reverse the magnetization condition of the rod 1 several times before the switches 4 respond to the final condition established in the rod. Moreover, the rod may be switched from one to the other of the conditions depicted in FIGS. 2A and 2B by applying a single pulse to only one of the control windings 2 and 3 to reverse the magnetization state of the associated section of the rod.

Thus this invention provides a multiple contact relay which is responsive to electronic pulses. It will be noted that the pair of switches 4 of FIG. 1 are arranged in the plane including the rod 1. Additional pairs of switches may be added to this configuration in other planes through the rod 1 to increase the number of contacts controlled thereby.

In addition, it should be pointed out that the instant invention may be controlled on a coincident current basis. In such a case, the windings 2 and 3 are each replaced by a pair of windings, and the magnitude of the switching pulses on these windings is adjusted so that the magnetizing force presented by any one winding is insufficient to reverse the remanent magnetization of the associated portion of the rod 1; however, the combined magnetizing force of two windings is sufficient to switch the remanent magnetization of the associated portion. In this manner, coincident drive selection of a particular relay in a matrix array may be attained.

Furthermore, in either case the invention may be controlled by selecting the remanent magnetization state of only one portion of the ferrite rod 1. Initially the remanent magnetization state of the other portion thereof may be set. Thereafter the associated switches may be operated and released by establishing the remanent magnetization of the one portion to aid or oppose, respectively, the existing magnetization of the other portion, since the latter is unaffected by reversals of the former in accordance with this invention.

It is to be understood that the above-described arrangements are illustrative of the principles of the invention. Numerous other arrangements may be devised by those skilled in the art without departing from the spirit and scope of the invention.

What is claimed is:

1. An electrical switching device comprising a rod of a magnetic material capable of assuming a plurality of stable remanent magnetization states, a reed switch, magnetically permeable means affixing each of the terminals of said switch to a corresponding end of said rod, and current-conducting means comprising a plurality of coils wound on said rod for establishing selected magnetization states in individual portions of said rod to activate said switch.

2. An electrical switching device comprising a rod of a material exhibiting a pair of stable remanent magnetization states, a magnetically responsive switch, a pair of magnetically permeable members connecting said switch to the ends of said rod and partially enclosing said switch on the side remote from said rod, and means for controlling the condition of said switch including current-conducting means for establishing predetermined remanent magnetization states in selected portions of said rod.

3. An electrical switching device comprising a pair of magnetically responsive switches, a rod of a material exhibiting two stable remanent magnetization states positioned between said switches, magnetically permeable means connecting corresponding ends of said rod and said switches, said last-mentioned means being shaped to partially enclose said switches, and means including a plurality of windings individually situated along different longitudinal sections of said rod for producing opposite magnetic poles at the ends of said rod to operate said switches and for eliminating said opposite magnetic poles to release said switches.

4. An electrical switching device comprising a single rod of a magnetic material capable of assuming a plurality of stable remanent magnetization states, magnetically responsive switching means, magnetically permeable means connecting opposite ends of said switching means to the corresponding ends of said rod, and means for determining the condition of said switching means comprising current-conducting means wound on said rod to establish particular stable remanent magnetization states in different portions of said rod.

5. An electrical switching device in accordance with claim 4 wherein said switching means comprises a plurality of individual reed switches.

6. An electrical switching device in accordance with claim 4 wherein said current-conducting means comprises a plurality of coils individually wound on different portions of said rod.

7. A switching device comprising a magnetic reed switch, a rod of a magnetic material capable of assuming a plurality of stable remanent magnetization states, means comprising a plurality of coils wound on distinct sections of said rod for establishing aiding or opposing magnetization states in said sections, and means connecting each of said distinct rod sections to corresponding terminals of said switch to complete a magnetic path for actuation of said switch.

8. An electrical switching device comprising a magnetic switch, an elongated member of magnetic material exhibiting a plurality of stable remanent states of magnetization, magnetic means positioning said switch magnetically in parallel with said member, winding means on said member for effecting a single remanent magnetization in said member to determine a flux path through said member and said parallel magnetic switch and for effecting distinct remanent magnetizations in said member, and magnetic means for providing distinct flux paths not along said switch for said distinct remanent magnetizations.

9. An electrical switching device in accordance with claim 8 wherein said last-mentioned magnetic means comprises a first and a second magnetic element positioned to the other side of said switch than said elongated magnetic member and magnetically parallel to said magnetic member, said first and second magnetic elements extending towards each other but separated from each other.

10. An electrical switching device in accordance with claim 8 wherein said last-mentioned magnetic means includes an intermediate lateral extension of said elongated magnetic member.

11. An electrical switching device comprising a magnetic rod means having substantially rectangular hysteresis characteristics and having a first and a second flux switching portion defined thereon, at least one magnetically responsive electrical contacting means having a first and a second terminal, a first and a second winding coupled respectively to said first and second flux switching portions energizable to induce a remanent flux in each of said first and second flux switching portions in the same direction and energizable to also induce remanent fluxes in said first and second flux switching portions in opposite directions, first magnetic means connecting opposite ends of said rod means respectively to said first and second terminals to complete a flux path through said contacting means when said remanent flux in each of said first and second flux switching portions is in the same direction to operate said contacting means, and second magnetic means also connected to opposite ends of said rod means to partially complete flux paths by-passing said contacting means when said remanent flux in each of said first and second flux switching portions is in opposite directions for restoring said contacting means.

12. An electrical switching device as claimed in claim 11 also comprising magnetic extensions on said rod means for further partially completing said last-mentioned flux paths by-passing said contacting means.

References Cited in the file of this patent

UNITED STATES PATENTS

| | | |
|---|---|---|
| 2,378,986 | Dickten | June 26, 1945 |
| 2,630,506 | Buch | Mar. 3, 1953 |